No. 686,319. Patented Nov. 12, 1901.
C. G. MORGAN.
SELF INFLATING TIRE FOR BICYCLES.
(Application filed Aug. 20, 1900.)
(No Model.)
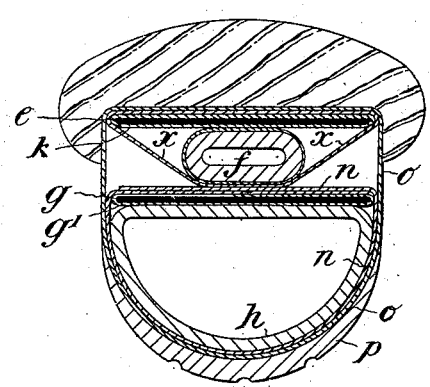
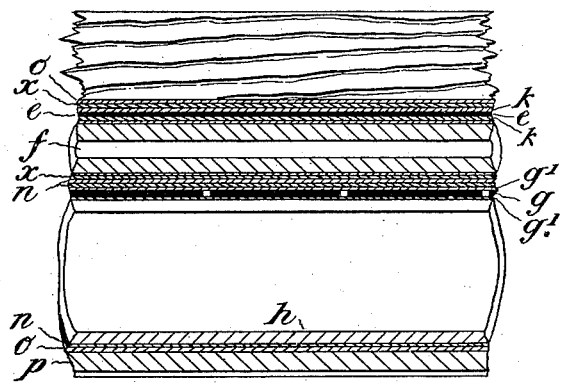
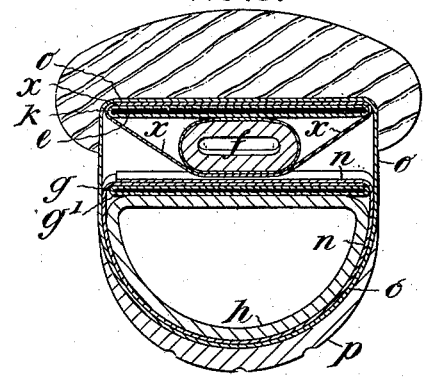
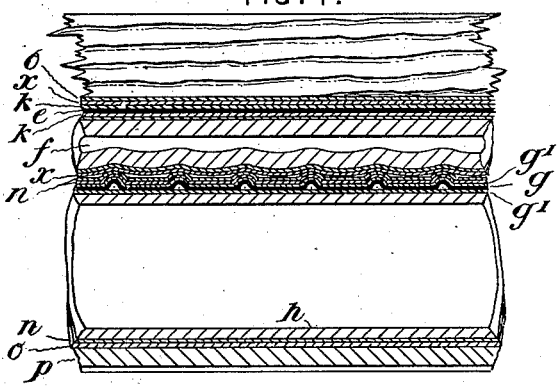
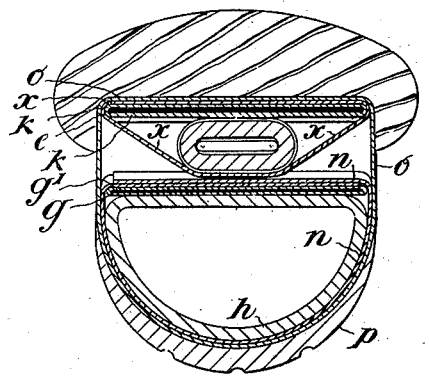
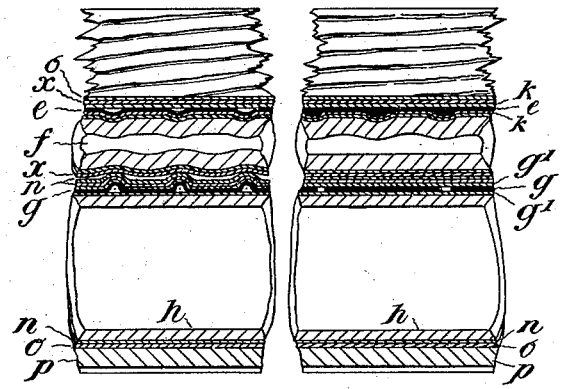
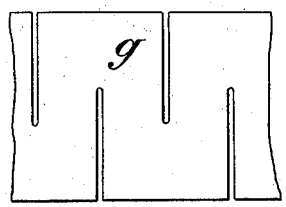
Witnesses:
Inventor
Charles George Morgan
by Henry Orth
Atty.
THE NORRIS PETERS CO., PHOTO-LITHO., WASHINGTON, D. C.

UNITED STATES PATENT OFFICE.

CHARLES GEORGE MORGAN, OF LONDON, ENGLAND.

SELF-INFLATING TIRE FOR BICYCLES.

SPECIFICATION forming part of Letters Patent No. 686,319, dated November 12, 1901.

Application filed August 20, 1900. Serial No. 27,450. (No model.)

*To all whom it may concern:*

Be it known that I, CHARLES GEORGE MORGAN, a subject of the Queen of Great Britain and Ireland, residing at No. 13 King William street, in the city of London, England, have invented new and useful Improvements in Self-Inflating Tires for Bicycles and other Vehicles, of which the following is a specification.

My invention relates to improvements in self-inflating tires of the kind forming the subject-matter of the patent granted to J. F. Everett and A. Kirkman, dated December 5, 1899, and numbered 638,628.

Now according to my present invention I make the following improvements: Instead of the outer band being continuous, so that it must either bend or slide longitudinally as it acts on the pumping-tube, or must act partly in one way and partly in another, thus causing considerable wear on the air-tube and in some cases on the pumping-tube, I make the outer band of a number of short segments, preferably covered with fabric and inclosed and securely fixed in a continuous pocket of canvas or other suitable material, with a small space between each of the segments, so that while remaining stiff transversely the band will freely contract and expand circumferentially at numerous points, and therefore it can act upon the pumping-tube without flexion of its material or practically any sliding movement, or I may make the outer band elastic longitudinally, while retaining its stiffness transversely in any other convenient manner, as by making it, for instance, of thin metal, celluloid, or other material corrugated transversely or of a plain band notched alternately on each side at short intervals nearly across its breadth or of crimped wire or otherwise. When made with corrugations or crimped, a further advantage is obtained, inasmuch as a better joint is made between the sides of the pumping-tube at the place where the tire is in contact with the ground and especially when the wheel is traveling over rough ground, or the inner band may be crimped or corrugated or provided with projections and the outer band may be made merely extensible. The air-tube, which is made inextensible in such manner as not to throttle the pumping-tube more than is necessary except at the place of contact with the ground, tends to increase circumferentially as it is inflated rather than to decrease. The air-tube is either endless or butt-ended and is in itself extensible, but is suitably made inextensible by inclosing it in an inextensible pocket, so that when the air-tube is inflated it and its pocket assume a more or less D-shaped section. The detachable pocket is further connected to the inner band by means of a strip of fabric lapped around and solutioned, and I provide means of access to the air-tube in any convenient or well-known manner—for instance, in the case of a tire without a detachable outer cover by means of a slit in the side of the lapping fabric and of the said inextensible pocket, which slit is closed by lacing. To prevent as much as possible any lateral movement of the pumping-tube, and consequently the "rolling" of the tire, the said pumping-tube is provided with flaps solutioned to the pumping-tube and around the inner band.

Figure 1 of the accompanying drawings is a cross-section of a tire made according to my invention, and Fig. 2 is a longitudinal section of part of same shown straight instead of curved to follow the contour of the wheel. Fig. 3 is a cross-section of a tire with a modified form of outer band, and Fig. 4 is a longitudinal section of part of same. Fig. 5 is a cross-section of a tire with a modified form of inner band. Fig. 6 is a longitudinal section of part of same, and Fig. 7 is a similar view of another slightly-modified form. Figs. 8 and 9 represent in plan other constructions of an extensible or elastic outer band; and Fig. 10 is an elevation of a portion of the tire to a reduced scale, showing the inlet to the pumping-tube and the connection from the air-tube to the pumping-tube.

The outer band $g$, as shown in Figs. 1, 2, and 7, is made of a number of short segments a little distance apart and covered with fabric $g'$, the whole being solutioned or stuck together. This outer band $g$ is securely fixed—for example, by solution in a continuous pocket $n$ of canvas—in such manner as to allow the band to expand and contract circumferentially at numerous points, thus permitting of its action on the pumping-tube $f$ without flexion of its material or practically any sliding movement, or I may make the outer band $g$ elastic longitudinally, while retaining its stiffness transversely in any other convenient manner, as by making it, for instance, of thin metal, celluloid, or other material corrugated transversely, as shown in Figs. 3 and 4, or of a plain band notched alternately on each side at short intervals nearly across its breadth, as shown in Fig. 8, or, as shown in Fig. 9, of crimped wire or otherwise as found most convenient. When the outer band $g$ is made with corrugations or provided with projections or is crimped, a further advantage is attained, inasmuch as a better joint is made between the inner sides of the pumping-tube $f$ at the place where the tire is in contact with the ground; or the inner band $e$, which is suitably covered with fabric or canvas $k$, may be corrugated, as shown in Figs. 5 and 6, or be provided with projections, as shown in Fig. 7, and the outer band $g$ may be made merely extensible or both the bands $e$ and $g$ may be corrugated or be provided with projections, as indicated, for example, in Figs. 5 and 6. The air-tube $h$ is suitably made inextensible by inclosing it in the inextensible D-shaped pocket $n$, which also incloses the outer band $g$, as aforesaid. To prevent as much as possible any lateral movement of the pumping-tube $f$, and consequently the rolling of the tire, the said pumping-tube is provided with flaps or a strip of fabric $x$, solutioned to the pumping-tube and around the inner band $e$, as shown most clearly in Figs. 1, 3, and 5. Finally, the inner band $e$ is further connected or stuck to the pocket $n$ by means of a strip of fabric $o$, surrounding the inner band and the pocket more or less, and the whole tire is provided with a thickened tread $p$ of rubber or the like.

As indicated in Fig. 10, air is admitted at $q$ to the pumping-tube, said air being forced around the pumping-tube as the wheel revolves past a back-pressure valve $r$ and by way of a pipe $t$ to the air-tube.

What I claim as my invention, and desire to secure by Letters Patent, is—

1. A self-inflating tire, comprising an air-tube, a pumping-tube surrounding the rim of the wheel, means for admitting air to said pumping-tube and forcing such air to the air-tube, and a band composed of contractible and expansible elements and arranged between the said pumping and air tubes, substantially as set forth.

2. A self-inflating tire, comprising an air-tube, a pumping-tube surrounding the rim of the wheel, means for admitting air to said pumping-tube and forcing such air to the air-tube, a band composed of contractible and expansible elements and arranged between the said pumping and air tubes and means for producing a wave-like formation in the said pumping-tube whereby the making of an air-joint within the said pumping-tube, above the point where the tire is in contact with the ground, is facilitated, substantially as set forth.

3. A self-inflating tire, comprising an air-tube, a pumping-tube surrounding the rim of the wheel, means for admitting air to said pumping-tube and forcing such air to the air-tube, a band composed of expansible and contractible elements and arranged between the said pumping and air tubes, means for producing a wave-like formation in the said pumping-tube whereby the making of an air-joint within the said pumping-tube above the point where the tire is in contact with the ground, is facilitated, a band surrounding the rim of the wheel between the latter and the said pumping-tube, and stays connecting such band with the said pumping-tube, whereby the tire is prevented from rolling, substantially as set forth.

4. A self-inflating tire, comprising an inextensible air-tube, an inextensible pumping-tube provided at one end with an air-inlet and at the other end with an air-passage to the said air-tube, a check-valve in said passage, an outer band arranged between the said pumping-tube and the said air-tube and composed of a number of segments secured at intervals in a canvas pocket, an inner band surrounding the rim of the wheel between the latter and the pumping-tube and stays connecting such band with the said pumping-tube, substantially as set forth.

5. A self-inflating tire comprising an air-tube, a pumping-tube surrounding the rim of the wheel, means for admitting air to said pumping-tube and forcing such air to the air-tube, and a band composed of interspaced segments arranged between the pumping and air tubes, for the purpose set forth.

6. A self-inflating tire comprising an air-tube, a pumping-tube surrounding the rim of the wheel, means for admitting air to said pumping-tube and forcing such air to the air-tube, a band composed of contractible and expansible elements, arranged between said air and pumping tubes, and an inner band surrounding the rim of the wheel between the latter and the pumping-tube and provided with transverse ridges at suitable distances apart, substantially as and for the purpose set forth.

7. A self-inflating tire, comprising an inextensible air-tube, an inextensible pumping-tube provided at one end with an air-inlet and at the other end with an air-passage to the said air-tube, a check-valve in said passage, an outer band arranged between the said pumping-tube and the said air-tube and composed of a number of segments secured at intervals in a canvas pocket, an inner band surrounding the rim of the wheel between the latter and the pumping-tube and provided with transverse ridges at suitable distances apart, and stays connecting such band with the said pumping-tube, substantially as set forth.

8. A self-inflating tire, consisting of an inextensible air-tube, an inextensible pumping-tube provided at one end with an air-inlet having a dust-cap, and at the other end with an air-passage to the pumping-tube, a check-valve in said passage, an outer band arranged between the said pumping-tube and the said air-tube and composed of a number of segments secured at intervals in a canvas pocket, an inner band provided with transverse ridges surrounding the rim of the wheel between the latter and the said pumping-tube and stays connecting such band with the said pumping-tube, the whole being secured together and provided with a thickened tread, substantially as set forth.

In testimony whereof I have signed my name to this specification in the presence of two subscribing witnesses.

CHARLES GEORGE MORGAN.

Witnesses:
GEORGE J. B. FRANKLIN,
WALTER J. SKERTEN.